(12) United States Patent
Koenig et al.

(10) Patent No.: US 7,751,923 B2
(45) Date of Patent: Jul. 6, 2010

(54) METHOD FOR CONTROL OF THE THICKNESS OF EXTRUDED FILM

(75) Inventors: Lothar Koenig, Westerkappeln (DE); Bartholomeus Trommelen, Gronau (DE)

(73) Assignee: Windmoeller & Hoelscher KG, Lengerich (DE)

( * ) Notice: Subject to any disclaimer, the term of this patent is extended or adjusted under 35 U.S.C. 154(b) by 309 days.

(21) Appl. No.: 10/541,355

(22) PCT Filed: Dec. 9, 2003

(86) PCT No.: PCT/EP03/14056

§ 371 (c)(1),
(2), (4) Date: May 16, 2006

(87) PCT Pub. No.: WO2004/060634

PCT Pub. Date: Jul. 22, 2004

(65) Prior Publication Data

US 2006/0216369 A1    Sep. 28, 2006

(30) Foreign Application Priority Data

Jan. 6, 2003    (DE) .................................. 103 00 374

(51) Int. Cl.
*B29C 39/00*    (2006.01)
*B29C 45/76*    (2006.01)

(52) U.S. Cl. ........................... 700/129; 700/54; 700/55; 700/155; 700/196; 700/303; 425/141; 264/40.1; 702/84

(58) Field of Classification Search ......... 700/108–110, 700/176, 32, 37, 51, 55, 73, 78, 89, 109, 700/122, 127–129, 155, 196, 303; 702/170, 702/84, 104, 179; 162/252, 253; 72/9.2, 72/128; 264/3.3, 40.1, 40.4, 209.4; 425/141; 73/159

See application file for complete search history.

(56) References Cited

U.S. PATENT DOCUMENTS 3,471,685 A * 10/1969 Bishop ........................ 702/179
3,610,899 A * 10/1971 Dahlin ........................ 702/84

(Continued)

FOREIGN PATENT DOCUMENTS

EP    1 319 492 A1    6/2003

(Continued)

*Primary Examiner*—Albert DeCady
*Assistant Examiner*—Dave Robertson
(74) *Attorney, Agent, or Firm*—Jacobson Holman PLLC

(57) ABSTRACT

A process for the automatic control of the thickness of extruded film lowers the deviations in the thickness of the film more quickly after the start of the extrusion process. The process includes the measurement of the thickness profile of the film just extruded by means of a thickness-measuring probe. The thickness-measuring probe is moved along the surface of the film substantially perpendicular to the conveying direction of the extruded film. The thickness-measuring probe records a thickness profile of the film for each measuring cycle at least over parts of the expansion of the film perpendicular to its conveying direction. While providing statistical values in relation to older measured values, the latest measured values during a predetermined time-frame at the start of the extrusion process are more heavily weighted by a computer than those measured during the normal operation.

2 Claims, 2 Drawing Sheets

U.S. PATENT DOCUMENTS

| | | | | |
|---|---|---|---|---|
| 3,914,585 A | * | 10/1975 | Wilhelm et al. | 700/129 |
| 4,000,402 A | * | 12/1976 | Higham | 700/129 |
| 4,707,779 A | * | 11/1987 | Hu | 700/55 |
| 4,903,528 A | * | 2/1990 | Balakrishnan et al. | 73/159 |
| 4,931,982 A | * | 6/1990 | Hayashida et al. | 700/129 |
| 4,939,929 A | * | 7/1990 | Ostman | 73/159 |
| 4,947,684 A | * | 8/1990 | Balakrishnan | 73/159 |
| 4,994,976 A | * | 2/1991 | Akasaka | 700/196 |
| 5,059,265 A | * | 10/1991 | Asakura | 156/64 |
| 5,071,514 A | * | 12/1991 | Francis | 162/259 |
| 5,121,332 A | * | 6/1992 | Balakrishnan et al. | 700/127 |
| 5,359,532 A | * | 10/1994 | Akasaka | 700/197 |
| 5,397,514 A | | 3/1995 | Breil | |
| 5,927,117 A | * | 7/1999 | Zhang | 72/9.1 |
| 5,928,580 A | * | 7/1999 | Nitta et al. | 264/40.4 |
| 6,185,468 B1 | * | 2/2001 | Wells | 700/30 |
| 6,606,534 B1 | * | 8/2003 | Abiko et al. | 700/155 |
| 6,850,857 B2 | * | 2/2005 | Ignagni et al. | 702/104 |
| 6,856,855 B2 | | 2/2005 | Hirata et al. | |

FOREIGN PATENT DOCUMENTS

WO    WO 02/24434 A1    3/2002

* cited by examiner

METHOD FOR CONTROL OF THE THICKNESS OF EXTRUDED FILM

CROSS-REFERENCE TO RELATED APPLICATION

This is a nationalization of PCT/EP03/014056 filed 9 Dec. 2003 and published in German.

BACKGROUND OF THE INVENTION

1. Field of Invention

The present invention relates to a process for the automatic control of the thickness of extruded film.

2. Description of the Prior Art

Processes of such type are used both in flat sheet film extrusion as well as in blown film extrusion.

In modern extrusion plants, these processes usually comprise the following process steps:

Measurement of the thickness profile of the film just extruded with the help of a thickness-measuring probe that is moved along the surface of the film substantially perpendicular (x) to the conveying direction (z) of the extruded film. The thickness-measuring probe records for each measuring cycle (MZ) a thickness profile (P) of the film at least across parts of the expansion of the film perpendicular (x) to its conveying direction (z), Transmitting the measured values to a control unit, Storage of the measured values underlying the thickness profiles in a storage unit, Provision of statistical values of the film thickness (5) using a computer (14), whereby the computer (14) takes into account measured values or information derived therefrom using a definite number (N) of measuring cycles (MZ) and, if necessary, provides measured values from recent and older measuring cycles with different weighting factors, Determination of the deviations in the statistical values of the film thickness from a target value, Generating control commands to a device for controlling the film thickness.

The measuring devices outlined above are known from published prior art. Thus the patent specification DE 40 09 982 A1 proposes a capacitive sensor for measuring the thickness of the wall of a film tube. However, even other principles of measurement are used to measure the film thickness. For instance, even the measurements of the transmission behavior of beta radiation, gamma radiation, x-radiation and infrared radiation have proved to be useful. In blown film plants they are usually guided around the film tube that is just extruded. In flat film plants the sensor traverses across the width of the flat film extruded.

In this connection, statistical specifications about the development of the film thickness in terms of time generated using a computer serve to avoid an overmodulation or overshooting of the control process. For this purpose the computer takes into account measured values of a definite number of measuring cycles. The statistical values usually involve the computation of an average value or meridian. However, it is also possible to determine other statistical parameters.

Furthermore, it is possible to provide the computer with information derived from the measured values instead of the measured values themselves. This information derived from the measured values can be statistical values that result in the updated statistical values by taking into account the most recent measured values. Thus, for instance, an average value can be computed by feeding the average value of the last N measurements to the computer. The computer then only has to take into account the current measured value while computing the updated average value.

Information derived from measured values can also exist in the form of recorded "older" control commands that are adjusted on the basis of current measured values.

Measured values from a definite number of measuring cycles are used while computing the statistical values. Often measured values from a definite number of measuring cycles, for instance, the last N measuring cycles are used. Finally, in order to compute the average value the sum of the measured values at definite positions in x-direction is calculated and divided by N.

Furthermore, various methods can be used to determine the contribution of the measured values from different measuring cycles in the computation of the statistical values. Thus, for instance, greater importance can be accorded to the more recent, just recorded measured values than to the older values while computing the statistical values.

This variable weighting of the measured values, in short $MW_n$, can be carried out with the help of weighting factors, here $k_n$. In a statistical function that is similar to the average value computation, the sum would be computed as follows:

$$\Sigma = k_1 MW_1 + k_2 MW_2 + \ldots + k_n MW_n$$

However, in this example, this sum would not be divided only by N, instead by the sum $$\Sigma = k_1 + k_2 + \ldots + k_n$$

in order to derive the statistical value similar to the average value. The information derived by the computer from the measured values and/or the statistical values is fed to a control unit that controls a device for controlling the film thickness. The thickness of the film can be controlled using different means. Thus, for instance, the width of the die gap or of the die ring can be varied in certain sections in order to be able to increase or decrease the throughflow of the melt at the desired places.

However, the control unit can also control the temperature of the melt by means of heating or cooling agents. Using the temperature it is possible to control in a targeted manner the viscosity of the melt. Should the viscosity of a melt be higher in one place than in other places, then the melted mass can "melt" more strongly in this place, thus causing the film to have a lesser thickness in this place.

Likewise the thickness of the film can be changed by stretching it in certain places. In this context, the property of the film that allows the already solidified and partially cooled film to stretch is exploited. The regions of the film that are stretched more strongly subsequently exhibit a lesser thickness than the regions of the film that are stretched using lesser strength. The force required for stretching the film is frequently made available by blow air. In this case the control unit controls the volume flow of the blow air in certain regions.

The measurement processes described above have proved to be useful in practice particularly in continuous operation. However, since in recent times a trend toward job orders of smaller sizes and thus toward a more frequent change-over of the film material can been noted, increasingly greater significance is attached to the automatic control of the film thickness at the start of the extrusion process.

However, film materials with unacceptable thickness tolerances and thus rejections have been produced using automatic control processes according to prior art during an important time span at the start of the extrusion process.

Therefore the objective of the present invention is to lower more quickly the deviations in the thickness of the film after the start of the extrusion process.

SUMMARY OF THE INVENTION

This objective is achieved by the fact that

While providing the statistical values in relation to the older measured values, the latest measured value(s) during a predetermined time-frame at the start of the extrusion process are more heavily weighted by the computer (14) than those measured during the normal operation.

By heavily weighting the more recent measured values, the thickness deviations at the start of the measuring process can be reduced. The stronger consideration of the more recently recorded measured values according to the invention is advantageously possible by lowering the number (N) of the measuring cycles from which the measured values are taken into account and/or by changing the weighting factors ($k_n$) with respect to the usual values in the normal operation.

However, it appears inexpedient to retain the process of strong consideration of the more recent, just derived measured values during the entire operation because it makes the control process too sensitive to variations. Therefore, the statistical parameters mentioned above (N and $k_n$) should be traced back in the course of the extrusion process to the values of the normal operation.

The required control of the number of measuring cycles from which the measured values are weighted and/or the change of the weighting factors to the usual values in the normal operation takes place advantageously in a series of steps within a large number of measuring cycles.

The object of this patent application is also a device that is suitable for executing the process according to the invention.

BRIEF DESCRIPTION OF THE DRAWINGS

An embodiment of the invention can be based on the drawings and the graphic representation.

The individual figures show.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
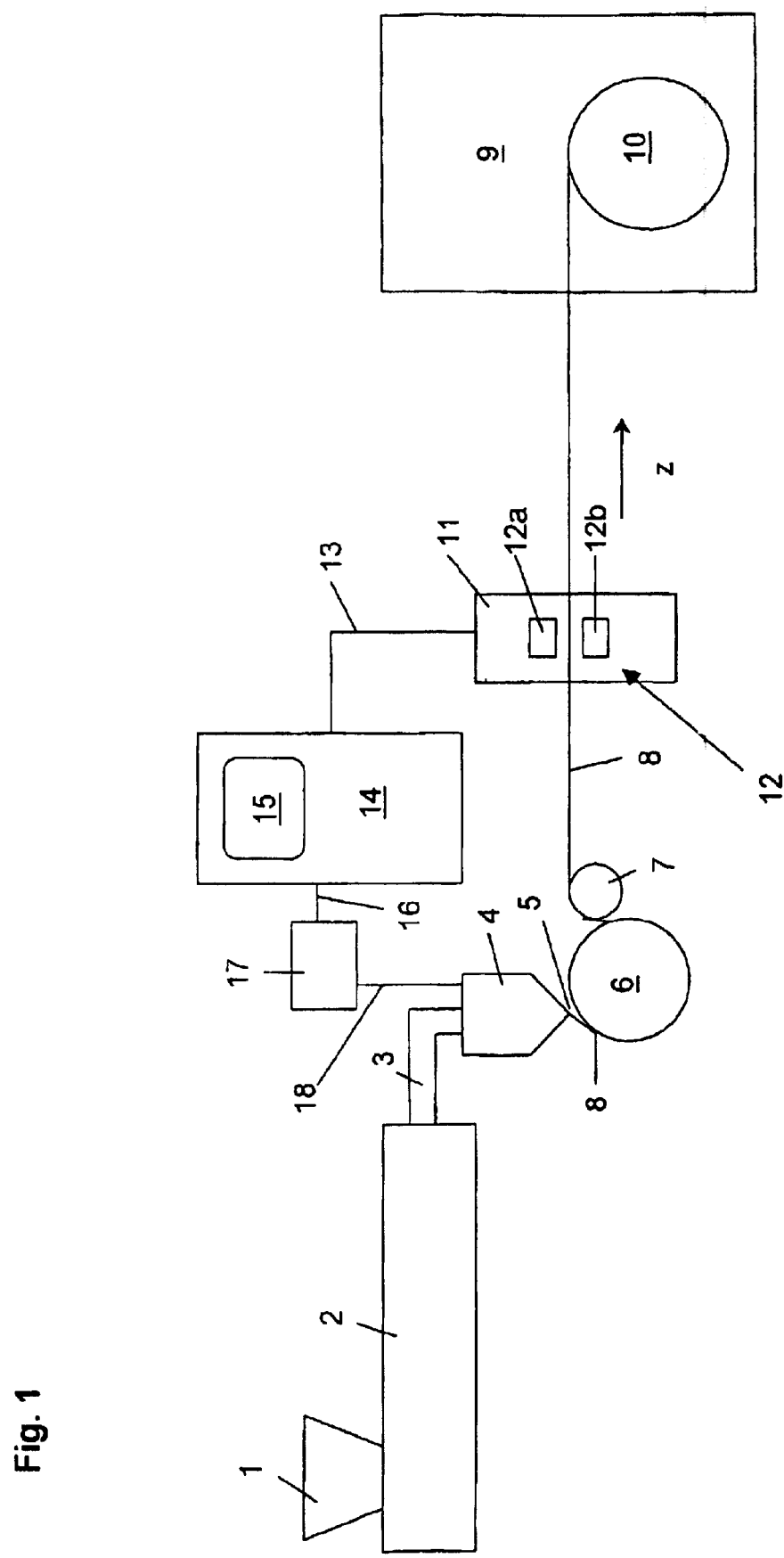
FIG. 1 side view of a device according to the invention for manufacturing a film using the process pursuant to the invention.
Figure 2:
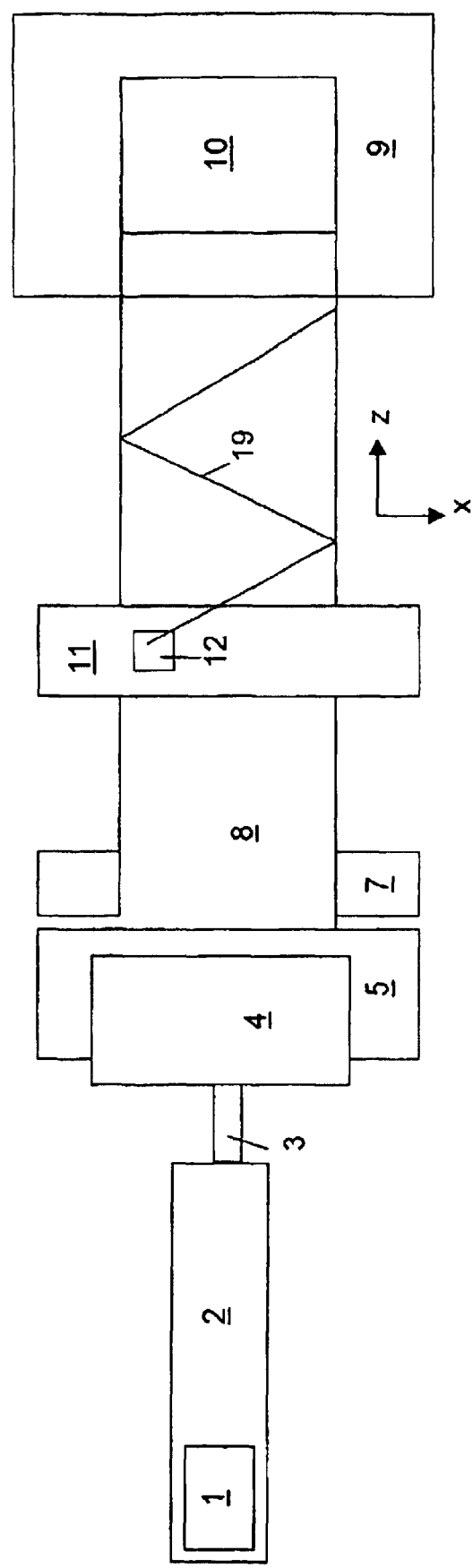
FIG. 2 top view of the device illustrated in FIG. 1

FIGS. 1 and 2 illustrate a device for manufacturing extruded films. A granulate is used as the starting material for manufacturing the films. The granulate is fed to the device by means of the feed hopper 1. From there the granulate enters into the extruder 2 in which it is molten by applying high pressure and heat. This melt is fed to the sheet die 4 using the pipeline 3. The melt is substantially distributed inside the sheet die 4 on its entire width. The melt emerges from the die gap 5 and arrives onto the chill roller 6. The gap width of the die gap 5 can be changed in certain sections in a manner that is not illustrated here. The melt solidifies on the chill roller and becomes film 8. This film 8 wraps around the chill roller 6 to a large extent and is cooled down strongly by the latter. The film 8 is fed by means of a deflecting roller 7 to a winding device 9 where it is wound up into a roll 10.

A thickness-measuring device 11 measures the thickness of the film 8 after it has passed the deflecting roller 7. The thickness-measuring device 11 comprises of the thickness-measuring probe 12 that consists of a transmitter 12a and a receiver 12b. The measured values are fed by means of a data line 13 to the computer and storage unit 14. The machine operator can access the measured values or the information derived therefrom by means of the monitor 15. The monitor 15 can also be used for the input of parameters. If necessary, another input device that is not illustrated here can also be used for this purpose. The computer and storage unit 14 provides information to the control unit 17 by means of the data line 16 for controlling the device that controls the thickness of the film. From this information the control unit 17 determines control commands and transmits these using the control line 18 to the device that controls the thickness of the film. In the embodiment of the present invention illustrated here the control commands are used for varying the gap width of the die gap 5.

FIG. 2 illustrates the effective progression of the path 19 created by the measuring heads 12 if they move at a uniform speed in the direction (x) perpendicular to the conveying direction (z) of the film 8. Since the measuring head 12 moves at a uniform speed, it provides a uniform measurement of the film thickness at definite positions in the x-direction in each measuring cycle. For the purpose of determining a complete thickness profile of the film 8, the measuring heads 12 move up to the borders of the film 8.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| LIST OF REFERENCE SYMBOLS | |
|---|---|
| 1 | Feed hopper |
| 2 | Extruder |
| 3 | Pipeline |
| 4 | Sheet die |
| 5 | Die gap |
| 6 | Chill roller |
| 7 | Deflecting roller |
| 8 | Film |
| 9 | Winding device |
| 10 | Roll |
| 11 | Thickness-measuring device |
| 12 | Thickness-measuring probe |
| 13 | Data line |
| 14 | Computer and storage unit |
| 15 | Monitor |
| 16 | Data line |
| 17 | Control unit |
| 18 | Control line |
| 19 | Effective path progression |
| 12a | Transmitter of the thickness-measuring probe |
| 12b | Receiver of the thickness-measuring probe |
| x | Direction of movement of the measuring head 11 |
| z | Conveying direction |

What is claimed is:

1. A process for the automatic control of the thickness of an extruded film, comprising:

measuring a thickness value profile of the extruded film with a thickness-measuring probe that is moved at a uniform speed along a surface of the film in a direction (x) that is substantially perpendicular to a conveying direction (z) of the extruded film, the thickness-measuring probe recording for each measuring cycle the thickness value profile of the film at least across parts of an expansion area of the film in the direction (x) perpendicular to the conveying direction (z) by measuring thickness values at definite positions in the x-direction in each measuring cycle;

transmitting the measured values to a control unit;

storing the measured values in a storage unit;

determining statistical values of the film thickness with a computer using a definite number of measuring cycles (N) and the stored measured values from recent and previous measuring cycles with different weighting factors (k), determining deviations in the statistical values of the film thickness from a target value; and generating control commands to a device for controlling the film thickness based at least in part on the deviations;

wherein the number of measuring cycles used during the predetermined time-frame at the start of the extrusion process is smaller than a number of measuring cycles used subsequent to the predetermined start time-frame, and/or wherein at least one weighting factor used during the predetermined time-frame at the start of the extrusion process is larger than the weighting factor used subsequent to the predetermined start time-frame; and wherein the determining statistical values includes dividing the sum of the weighted measured values by the number of measuring cycles (N) and/or by the sum of the weights (k); and wherein the number of the measuring cycles (N) and/or at least one weighting factor(s) (k) used during the predetermined start time at the start of the extrusion process is/are traced back in a series of steps within a large number of measuring cycles to a larger number of measuring cycles and/or an at least one smaller weighting factor(s) used in the operation subsequent to the predetermined start time-frame.

2. A device for the automatic control of the thickness of an extruded film, comprising:

a thickness-measuring probe that measures a thickness value profile of the extruded film that is moved at a uniform speed along a surface of the film in a direction (x) that is substantially perpendicular to a conveying direction (z) of the extruded film, the thickness measuring probe recording for each measuring cycle the thickness value profile of the film at least across parts of an expansion area of the film in the direction (x) perpendicular to the conveying direction (z) by measuring thickness values at definite positions in the x-direction in each measuring cycle;

a device that transmits the measured values to a control unit;

a storage unit that records the measured values and information derived therefrom;

a computer that determines statistical values of the film thickness using a definite number of measuring cycles (N) and the recorded measured values from recent and previous measuring cycles with different weighting factors (k), and determines deviations in the statistical values of the film thickness from a target value; and a device that generates control commands to a device that controls the film thickness based at least in part on the deviations;

wherein the number of measuring cycles used during the predetermined time-frame at the start of the extrusion process is smaller than a number of measuring cycles used subsequent to the predetermined start time-frame, and/or wherein at least one weighting factor used during the predetermined time-frame at the start of the extrusion process is larger than the weighting factor used subsequent to the predetermined start time-frame; and wherein the determining statistical values includes dividing the sum of the weighted measurements by the number of measuring cycles (N) and/or by the sum of the weights (k);

and wherein the number of the measuring cycles (N) and/or at least one weighting factor(s) (k) used during the predetermined start time at the start of the extrusion process is/are traced back in a series of steps within a large number of measuring cycles to a larger number of measuring cycles and/or an at least one smaller weighting factor(s) used in the operation subsequent to the predetermined start time-frame.

* * * * *